(12) United States Patent
Rez et al.

(10) Patent No.: US 9,995,216 B1
(45) Date of Patent: Jun. 12, 2018

(54) DISC TURBINE ENGINE

(71) Applicants: Mustafa Rez, Covina, CA (US); Bassel Rez, Covina, CA (US)

(72) Inventors: Mustafa Rez, Covina, CA (US); Bassel Rez, Covina, CA (US)

(*) Notice: Subject to any disclaimer, the term of this patent is extended or adjusted under 35 U.S.C. 154(b) by 0 days. days.

(21) Appl. No.: 15/688,521

(22) Filed: Aug. 28, 2017

(51) Int. Cl.
| *F02C 3/073* | (2006.01) |
| *F02C 3/16* | (2006.01) |
| *F02C 5/04* | (2006.01) |
| *F01D 1/32* | (2006.01) |
| *F02C 3/045* | (2006.01) |
| *F02C 3/067* | (2006.01) |
| *F02K 3/072* | (2006.01) |
| *F02C 7/08* | (2006.01) |
| *F02C 7/10* | (2006.01) |

(52) U.S. Cl.
CPC .............. *F02C 3/073* (2013.01); *F02C 3/165* (2013.01); *F02C 5/04* (2013.01); *F01D 1/32* (2013.01); *F02C 3/045* (2013.01); *F02C 3/067* (2013.01); *F02C 7/08* (2013.01); *F02C 7/10* (2013.01); *F02K 3/072* (2013.01)

(58) Field of Classification Search
CPC .. F02C 3/067; F02C 3/073; F02C 7/08; F02C 7/10; F02C 3/045; F02C 6/08; F02K 3/072

See application file for complete search history.

(56) References Cited

U.S. PATENT DOCUMENTS

| 762,175 | A | 6/1904 | Lees | |
|---|---|---|---|---|
| 1,186,950 | A | 6/1916 | Seguin | |
| 2,428,330 | A * | 9/1947 | Heppner | F02C 3/073 415/199.5 |
| 2,477,798 | A * | 8/1949 | Griffith | F02C 7/18 415/79 |
| 3,005,311 | A | 10/1960 | Ross | |
| 3,363,419 | A * | 1/1968 | Wilde | F02K 3/062 415/119 |
| 4,024,705 | A | 5/1977 | Hendrick | |
| 4,506,502 | A * | 3/1985 | Shapiro | F02C 3/073 60/39.43 |
| 8,192,141 | B1 * | 6/2012 | Dale | F02C 3/073 415/199.5 |
| 2006/0090450 | A1 * | 5/2006 | Moniz | F01D 1/26 60/226.1 |
| 2008/0093171 | A1 * | 4/2008 | Portlock | F01D 5/022 184/6 |

* cited by examiner

*Primary Examiner* — Pascal M Bui Pho
*Assistant Examiner* — Katheryn Malatek
(74) *Attorney, Agent, or Firm* — Kirk A. Buhler; Buhler & Associates

(57) ABSTRACT

A disc turbine engine includes a multi disc engine in which each disc engine includes a turbine blade, and low-pressure compressor blade, a high-pressure compressor blade and a bearing that runs the disc engine freely around a shaft. Each disc engine has its own cooling system, the compressor's blades act as cooling fins for the turbine blade, and air bleeding from the high-pressure compressor to the lower pressure compressor through a hollow turbine blade. Cooling the nozzle is by attaching the nozzle to the guide fan and by air bleeding through the hollow body. There is no stator in between the disc engine and no large shaft is required because the power produced by each turbine blade is consumed by its own compressor. The weight and cost of this engine will be less than other engines at the same thrust output.

15 Claims, 11 Drawing Sheets

DISC TURBINE ENGINE

CROSS REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a turbine engine. More particularly, to rearrange the compressor and turbine in different ways to reduce the size of the engine. This will increase the efficiency and reduces the heat impact on the nozzle and the turbine blades.

Description of Related Art Including Information Disclosed Under 37 CFR 1.97 and 1.98

The evolution of the turbine engine has been utilized in aircraft to propel an airplane through the air with great speed and efficiency. Nearly all engines are constructed in a linear arrangement to use a single or two common shaft where airflow runs into a compressors that compresses an air and fuel mixture. The compressed mixture then is ignited and then expands through turbines where the hot exhaust gasses are expelled out of the turbine to provide propulsion. The elongated engine is extremely inefficient for size and further the high temperature of the exhaust requires expensive materials to resist damage from exposure of the heat. In old turbine engines, there is a front compressor (cold region) and a combustion chamber (hot region), and the turbines (hot regions). The front turbine and nozzles will be very hot and this can create a problem in a turbine engine and reduces the ability of the turbine to run at high temperatures with more efficiency.

In old technology turbine engines have the limitations in operation. One limitation is that the pressure of combustion needs to be equal or less than the pressure created by the compressor. This limits the power of thrust. In order to obtain more thrust, either the compressor needs to create more pressure or the size of the engine needs to be increased. As today's compressors are limited to the pressure produced, there is no way to increase the pressure with current compressor technology. All the turbine engines are consistently are being increased in size to accommodate bigger and faster aircraft to the point where the engines are so big that they become an aerodynamic and design obstruction.

Other limitations of the high temperature of the engine on the nozzle and turbine blade will be restricted to the increase of pressure in the system. The disc engine has a unique cooling system and good heat management.

Prior art turbine engines are engines Turbofan bypass jet engines where a turbo fan jet engine uses bypass flow that consists of the engine core (as described above) plus an added turbo fan blowing air through an added bypass cavity. In operation, the additional flow of air via the bypass cavity is mixed with the hot gases exiting the nozzle of the engine core thus boosting the thrust. Some design limitations of the turbofan bypass engine are the same as the jet engine previously identified plus the pressure of the bypass air jet is limited by the pressure produced by the fan.

Another prior art engine is a jet engine with an afterburner. Some military planes have jet engines with afterburners (fuel injector mounted into the bypass cavity). In operation gasoline is dispensed into the bypass cavity thereby increasing the temperature and the specific weight of the bypass flow to increase the thrust during emergency situations. This design has the limitations of the jet engine with after-burner are the same or similar to the jet engine above. The after-burners can be very efficient, and they also must be used sparingly during emergency situations. The additional mass that is added to the flow is used more efficiently if the speed of the gases exiting the nozzle could be increased because the thrust equals the mass of the gases multiplied by the speed of the gases. The pressure in the combustion chamber and the bypass ducts is limited to the pressure created by the fan and the compressor, thereby creating a limit to the speed of the exhaust gases.

U.S. Pat. No. 762,175 issued Jun. 7, 1904 to H. T. Lees discloses an Explosive Turbine. The explosive turbine is a steam or vapor turbine where steam or vapor enters the center of the turbine and as the steam or vapor exits the turbine the turbine spins to create rotation. This patent does not disclose the use of the fuel entering the turbine that is then ignited where it expands to create thrust or lift to the turbine.

U.S. Pat. No. 1,186,950 issued Jun. 13, 1916 to M. Seguin discloses a Gas Engine. The gas engine uses Air that enters the turbine is compressed as it is spun within the turbine. A series of small combustion chambers located on the outer edge of the turbine. This patent does not disclose a continuous combustion process and the gas engine creates rotational motion instead of thrust.

U.S. Pat. No. 3,005,311 issued Oct. 24, 1961 to F. W. Ross discloses a Gas Turbine Engine with Combustion inside Compressor. This engine includes multiple internal partitions where the compression, ignition and expansion take place in each of the different partitions. This patent does not provide a single chamber where the rotation of the engine provides compression, fuel is added to the compressed air and then ignited to drive the engine and create thrust.

U.S. Pat. No. 4,024,705 issued May 24, 1977 to Lewis W. Hedrick discloses a Rotary jet Reaction Turbine. This jet turbine air or an air fuel mixture enters the turbine where it is compressed and the ignited. The ignition continues the rotation of the turbine. The engine turns a shaft that creates rotational energy. This patent does not disclose using the engine for thrust or varying the amount of thrust by opening or closing the exhaust port.

What is needed is an engine that can operate at higher temperatures to increase the efficiency of the engine and decrease the heat impact on the nozzle and the turbine blades, and make the engine smaller, less weight and more efficient. The proposed design provides an engine with these characteristics.

BRIEF SUMMARY OF THE INVENTION

It is an object of the disc turbine engine in this document to mix the cold region with the hot region and together this cools down the hot region. This design is the most efficient for heat management and as an energy recover system.

It is an object of each disc engine to have its own cooling system. The disc turbine engine has air bleeding that uses a cooling system that is reused in the low compressor section.

It is an object of the disc turbine engine to consume its own power. There is no need for a big shaft in the disc turbine engine.

It is another object of each disc engine, for the compressor blade(s) to absorb the extra heat from the turbine blade and convert the extra heat as an energy recovery system.

It is another object of the disc turbine engine, from an aerodynamic view point, for the turbine disc engine to bend and rotate each compressor and turbine stage independently at its own optimum speed at each operating condition. This optimization is impractical in prior art turbine engines.

It is another object of the disc turbine engine for each disc to work independently from each other and each turbine to have its own compressor, and the power will be transferred from the turbine to its own compressor.

It is still another object of the disc turbine engine to be the most efficient because there is no stator in the engine, the turbine and compressor is compacted together in one disc and there is no shaft. The disc turbine engine will cost and weigh less.

It is still another object of the disc turbine engine to be more efficient because the engine can operate at higher temperatures.

It is still another object of the disc turbine engine to be compact in size with less weight than other turbine engines with the same thrust output.

It is still another object of the disc turbine engine to consume less fuel because the engine has a higher efficiency than older technology engines.

It is still another object of the disc turbine engine to be faster and less expensive and requires fewer maintenance repairs.

It is still another object of the disc turbine engine to operate as a jet engine, a turbofan engine, a turbo prop engine and a turboshaft engine.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
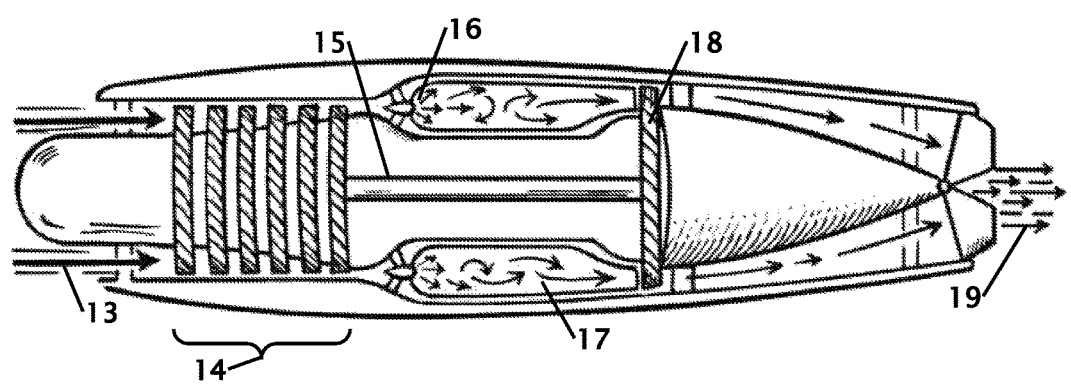
FIG. 1 shows a sectional view of a prior art jet engine.

FIG. 1 shows a sectional view of a prior art jet engine. In prior art jet engine, air 13 enters into the front of the engine. As the air passes into the engine, a series 14 of blades compress the air. The compressed air then is mixed with a fuel spray 16. In this section of the engine the fuel and air mixture is ignited in the burner 17 section of the engine. As the fuel and air burns, it expands and passes through a turbine and turns the shaft 15. The turning shaft 15 turns the blades of the air compressor 14 to keep the process as a continuous flow through the engine. After the turbine 18 the burned air and fuel is exhausted 19 out of the engine to provide thrust to push the engine forward. The shaft 15 transfers all of the load from the turbine 18 to the air compressor section 14.

Figure 2:
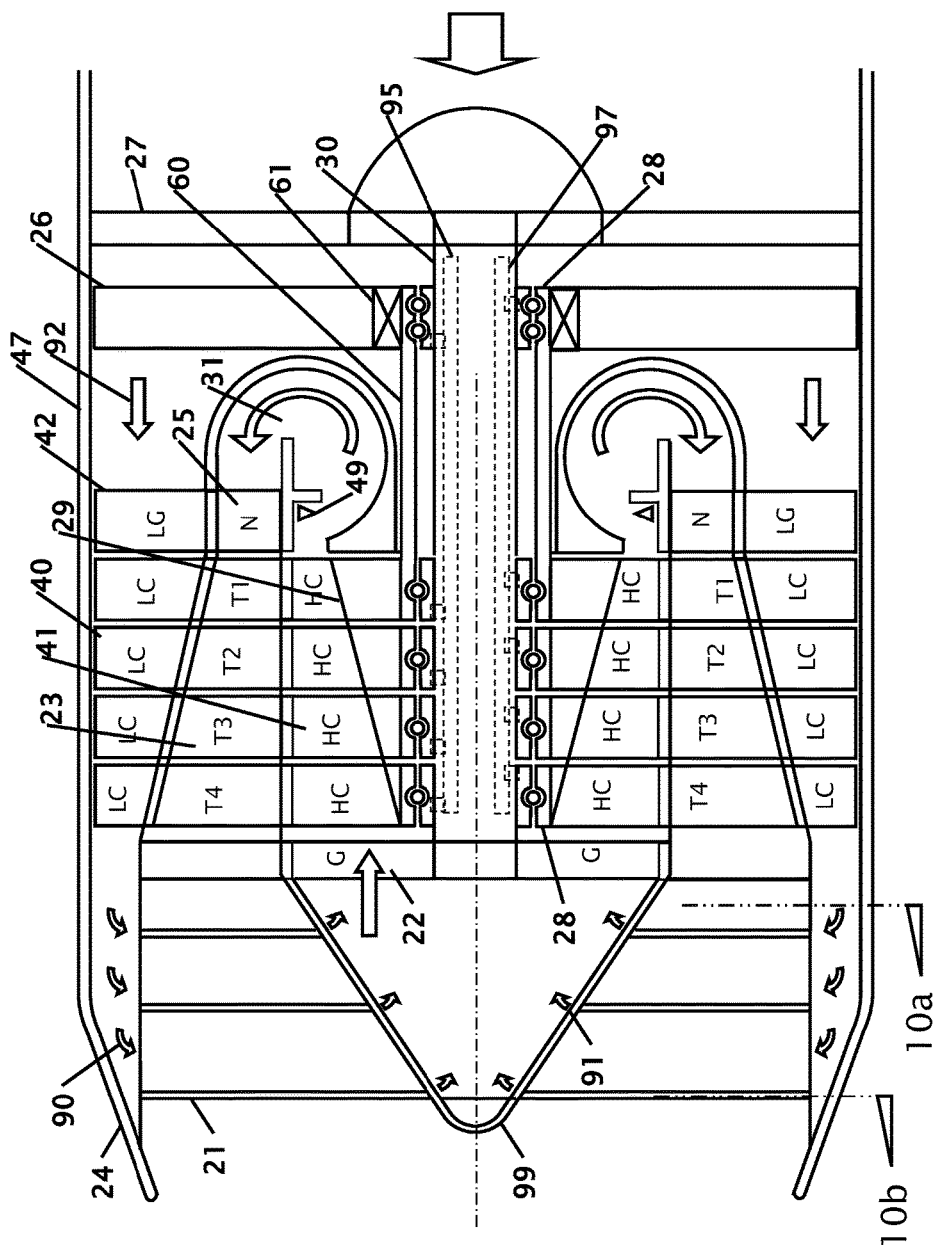
FIG. 2 shows a sectional view of a disc turbine engine, jet engine with a fixed shaft.

FIG. 2 shows a sectional view of a disc turbine engine. The jet engine has a fixed shaft. As a general description, instead of the compressor and turbine being placed in an elongated arrangement in the engine, the compressor and turbine are placed in a concentric arrangement in the engine. Air initially enters 100 into the front of the disc turbine engine and initially passes through the structural support and guide 27 and then the fan 26 with gear 61. The air 92 then passes to the section of the low pressure compressor 40 of the engine through guide fan 42. The guide fan 42 aligns the air stream and then passes through one or more low pressure compressors 40. The low-pressure compressors 40 provide an initial compression to the air. A dividing wall 24 separates the outer compressor(s) 40. After the first pass through the disc engine, the air 90 is directed through pipes 21 to inner exhaust nozzle 99 of the engine. Another guide fan 22 orients the air flow into the inner high-pressure compressors 41.

A guide 29 reduces the flow cross-section to increase the compression of the air. Fuel is then sprayed 49 into the compressed air stream. The fuel and air mixture is then ignited in the combustion chamber 31 and is directed 94 towards nozzle 25. The burnt fuel is then passed through a series of turbines 23. The rotated turbines are mechanically linked with to the compressors so they can turn together without requiring a shaft. One or more of the disc engines are required first disc engine 46 are connected with bearings 28 to the shaft 60 to provide power to the front fan 26. The exhaust 101 then passes out the end of the disc engine to provide thrust.

Figure 8:
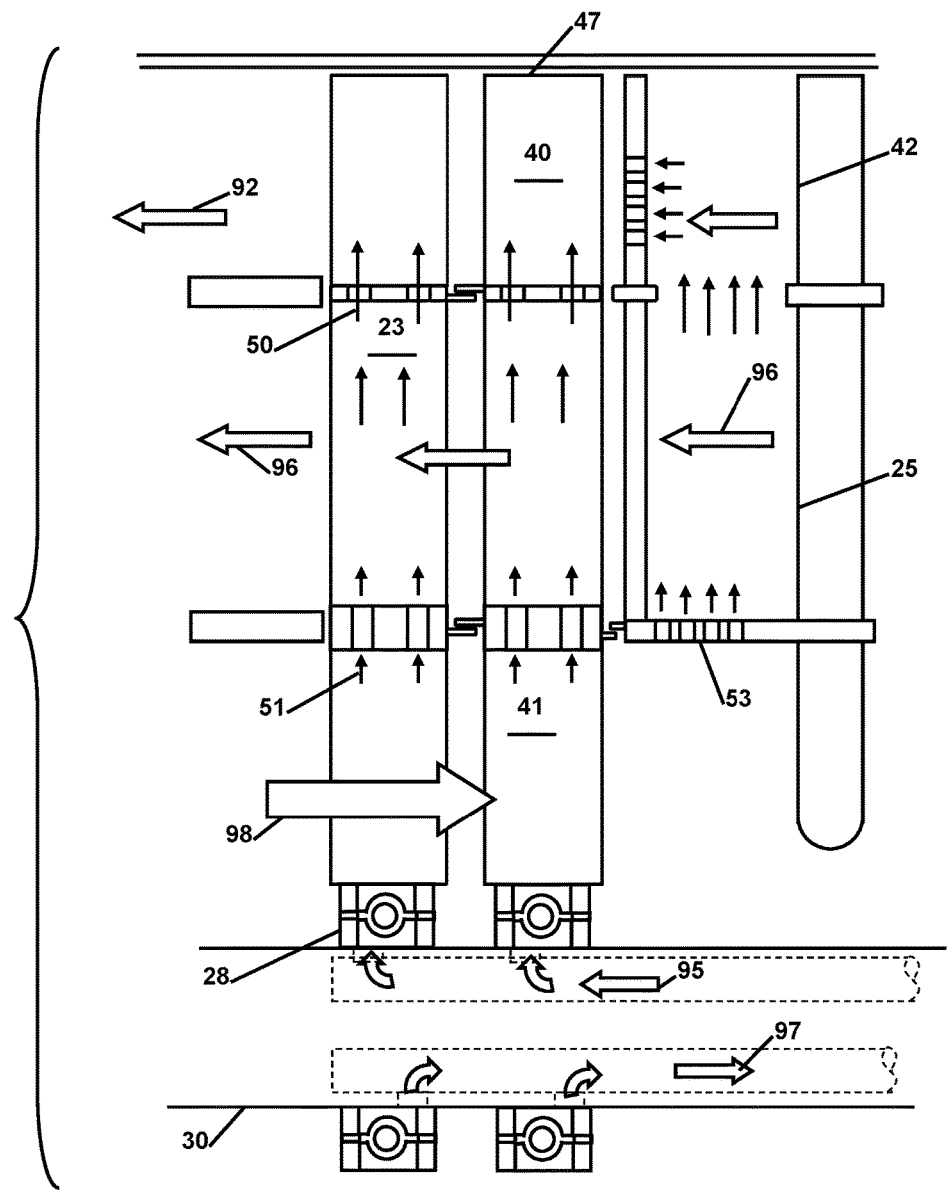
FIG. 8 shows a sectional view of the disc engine, cooling the turbo blade and lubricating the bearings.

Each disc engine has its own cooling system. The blades of the high-pressure compressor blade 41 and the low-pressure compressor 40 acts as a cooling fin for the blade of the turbine 23. A series of air bleed holes 50 and 51 pass from the high-pressure compressor blade to the blade of the turbine to the blade of the low-pressure compressor 40 as shown in FIG. 8.

The blades of the low-pressure compressor and the high-pressure compressor absorbs heat from the blade of turbine and converts the heat to high pressure as energy recovery.

The piping or channels 21 will transfer the air from the low pressure compressor 40 section to the high pressure compressor 40 section through the exhaust nozzle 91. The air will be absorbed as heat in this section and will convert the heat to higher pressure for energy recovery.

Cooling and lubrication of all the bearings is through oil channels 95 and 97 through the fixed shaft 30. The oil is cooled by passing the oil through pipes 95 and 97 in front of the guide fan 27.

Figure 9:
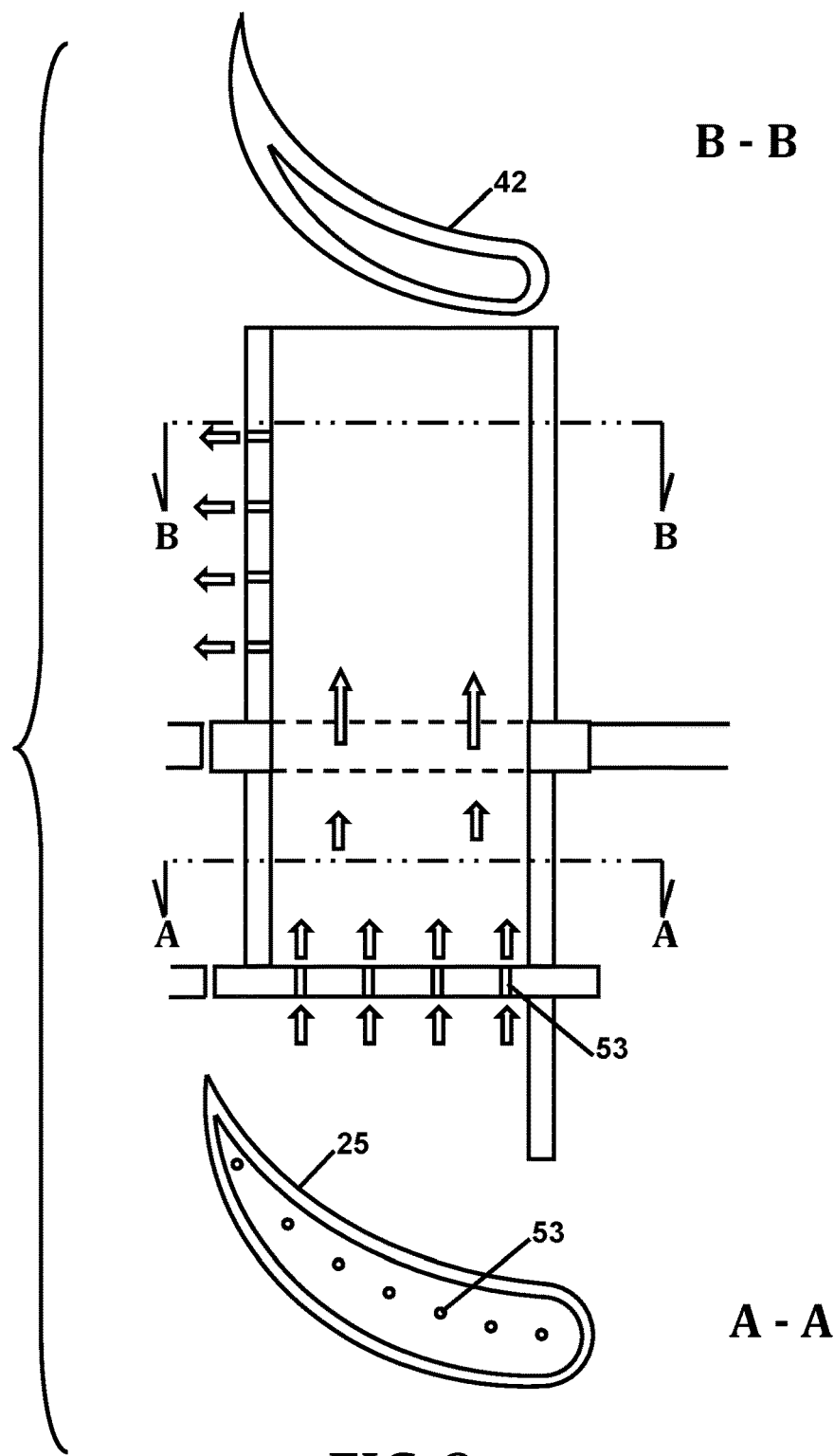
FIG. 9 shows a sectional view of the cooling of the nozzle.

Cooling of the combustion chamber wall 31 is with cool air flowing around 92. Cooling the nozzle in front of the turbines by connecting the hollow body 25 with the hollow guide fin body 42 and by high-pressure air bleed 41 to the lower pressure section 92 as shown in FIGS. 8 and 9. The fan 26 can run by a reduction gear 61 as needed for the design.

Figure 3:
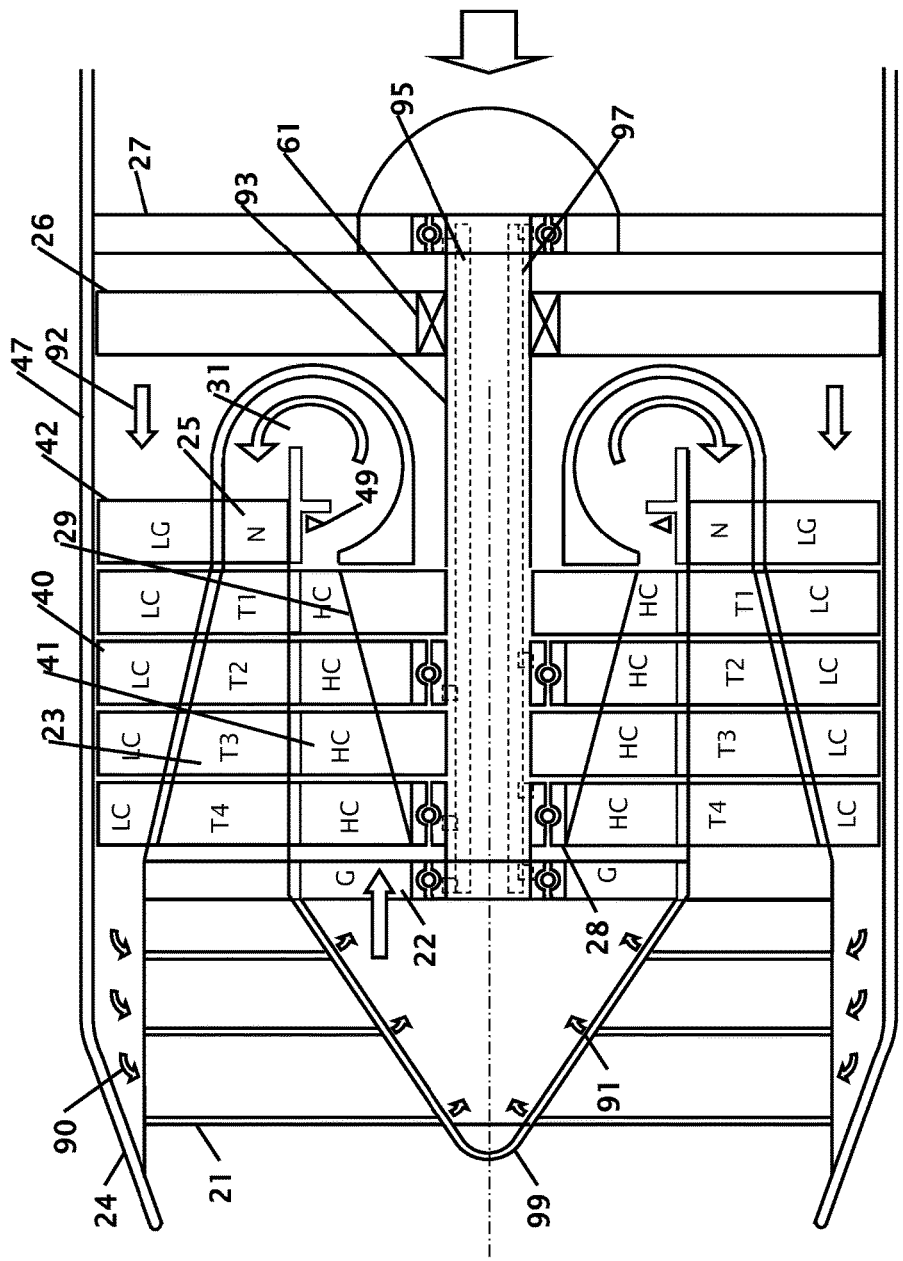
FIG. 3 shows a sectional view of a disc turbo engine, jet engine with a running shaft.

FIG. 3 shows another sectional view of the disc engine in an alternative embodiment as a disc turbo engine, jet engine with a running shaft. In this alternative variation, the same compressors 40 and 41 are used, but the shaft is a different configuration. The turbine 23 disc is connected together with the shaft 93 and some turbine discs are run independently over the shaft 93.

It is contemplated that as few as one or more than four-disc engines can be incorporated into the disc turbine engine based upon the requirement for the size of the engine. The front fan 26 can be run by a reducing gear 61 as needed based upon the design requirements.

Figure 4:
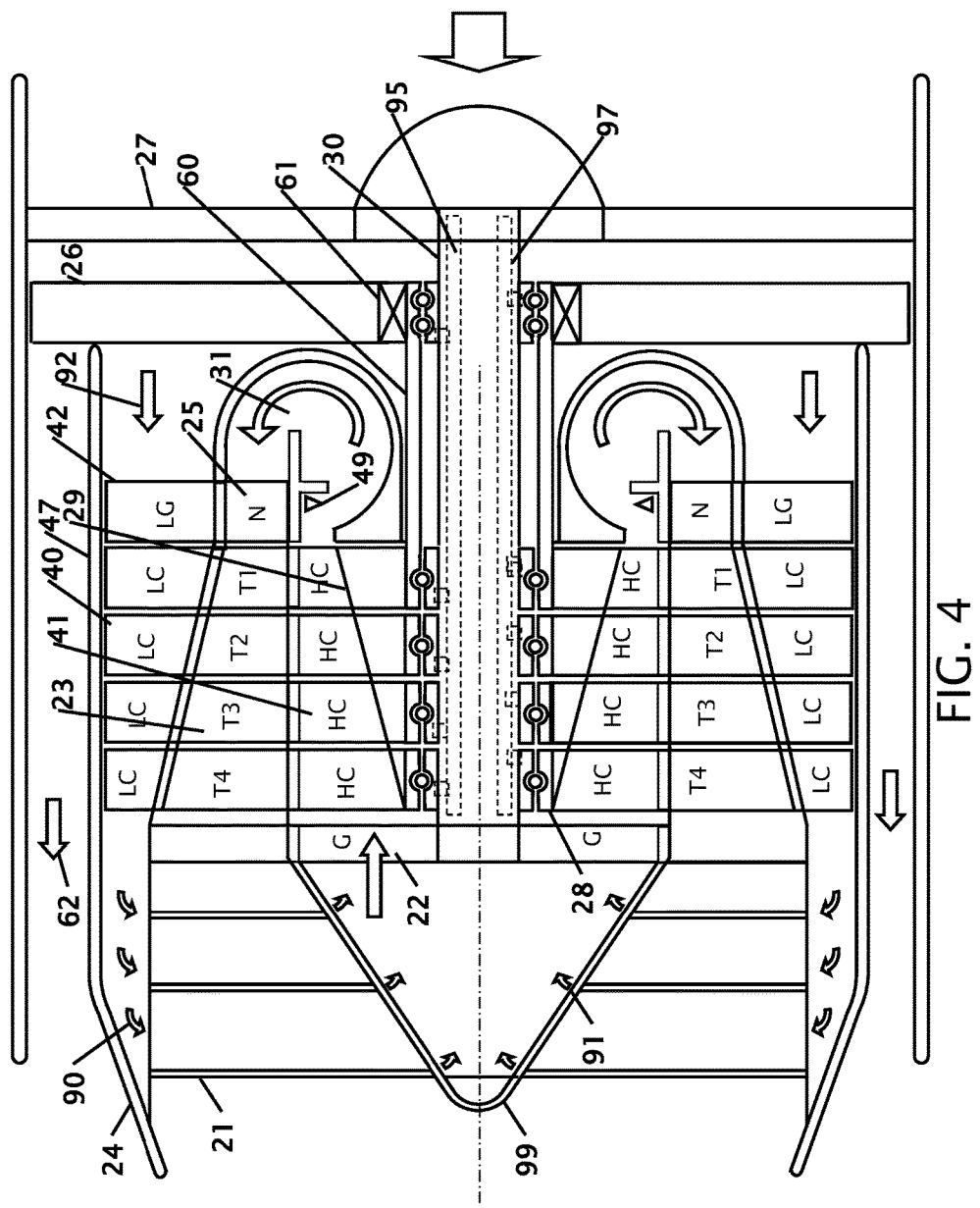
FIG. 4 shows a sectional view of a disc turbo engine, turbo fan engine.

FIG. 4 shows a sectional view of a disc turbo engine, turbo fan engine. This is the same as FIG. 2 with the difference of a bigger fan 26 with bypass 62.

Figure 5:
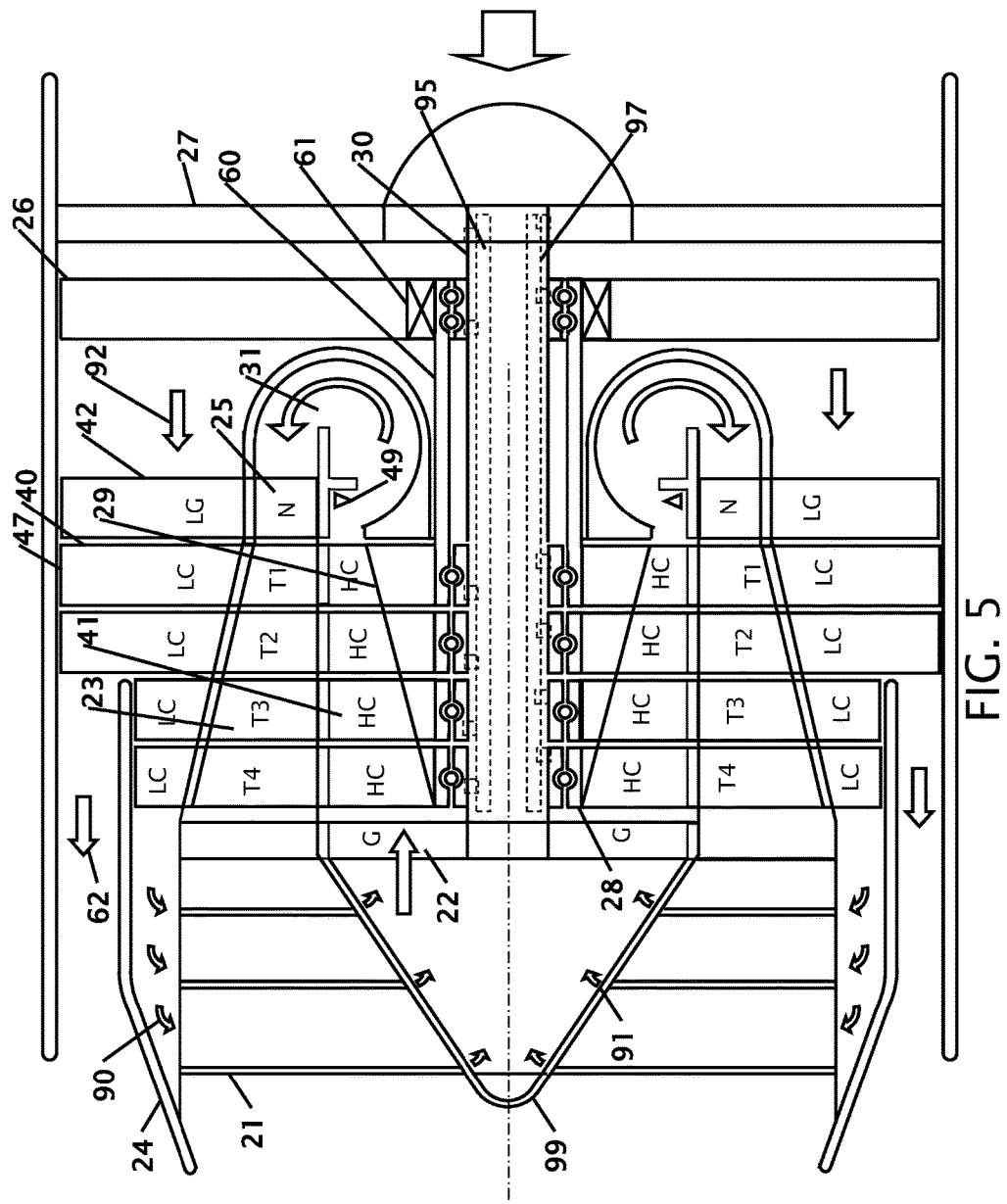
FIG. 5 shows a sectional view of a disc turbo engine, high bypass ration turbo fan engine.

FIG. 5 shows a sectional view of a disc turbo engine, high bypass ration turbo fan engine. This is the same as FIG. 2 with the difference of a bigger fan 26 and two larger compressors 40 that allow more air in bypass 62.

Figure 6:
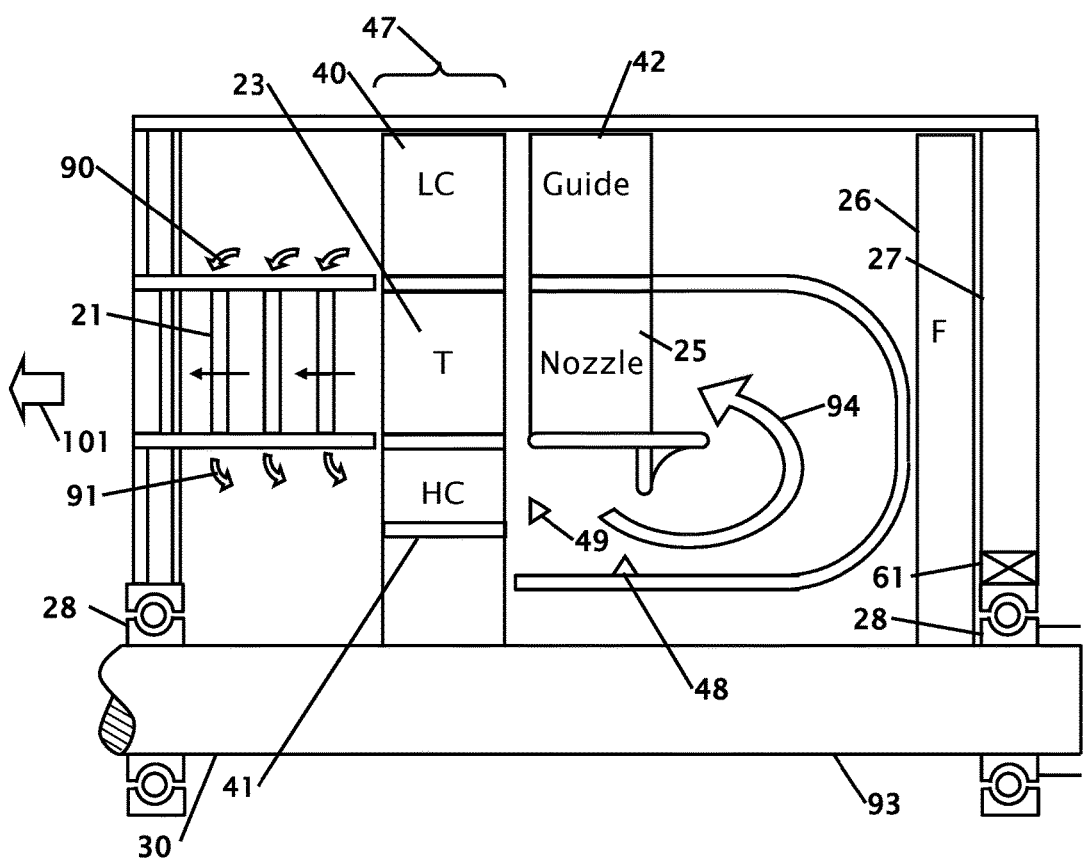
FIG. 6 shows a sectional view of a disc turbo engine, small turbo jet engine.

FIG. 6 shows a sectional view of a disc turbo engine, small turbo jet engine. This simplified figure shows just one-disc engine 47. This single disc 47 has a low-pressure compressor 40 on the outside of the disc and a high-pressure compressor 41 on the inner diameter of the disc and one turbine vane 23. Air flow into the disc engine passes through the fan 26 and is oriented with the guide 42 into an outer low-pressure compressor 40. Air is moved 90 to 91 from the low-pressure compressor 40 to the inner higher compress through pipes or channels 21. After the compressed air passes the last high pressure compressor 41, a fuel spray 49 is added into the air flow. An igniter 48 lights the air and fuel mixture and the air-fuel mixture burns in the combustion flow 94. The nozzle 25 then directs the expanded combustion flow towards the turbine 23 that turns the disc engine 47. The pipes 21 allow air flow from the turbine 23 through the engine and can exit the engine as thrust 101 or exhaust. The disc engine 47 turns the shaft 93 with the fan 26. The shaft 93 is small in size because some of the power from the turbine blades is consumed by the low-pressure compressor 40 and the high-pressure compressor 41.

Figure 7:
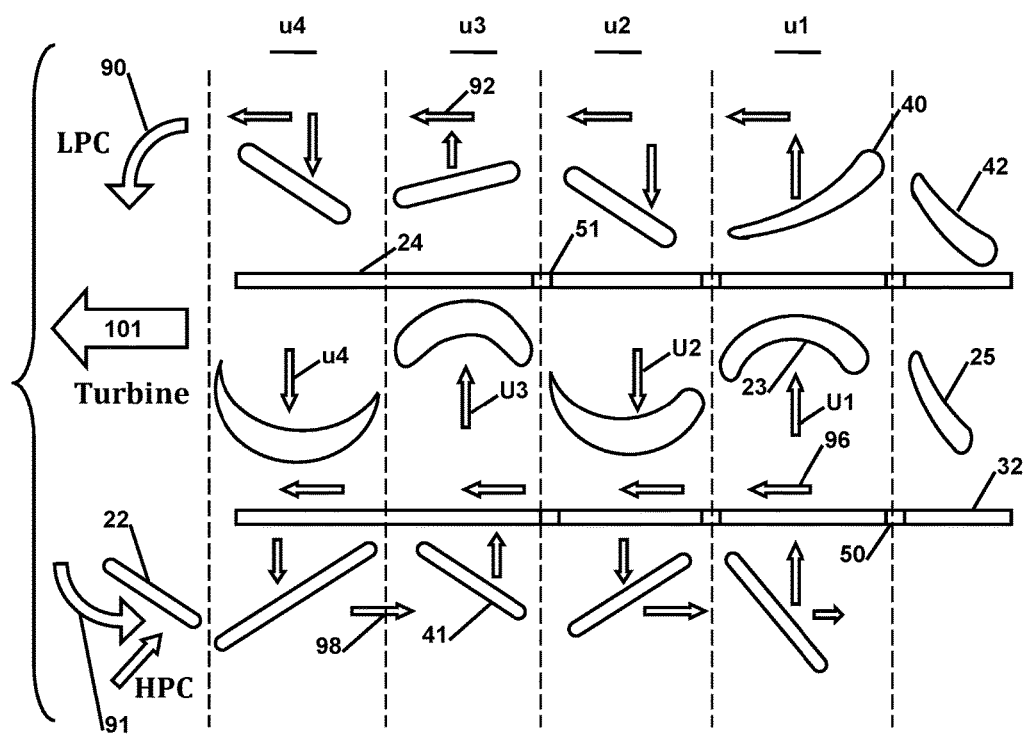
FIG. 7 shows the compression and turbine blades without stators.

FIG. 7 shows the compression and turbine blades without stators. This figure shows a four-disc engine with each disc engine having a low-pressure compressor 40, a turbine 23 and a high-pressure compressor 41. The low-pressure compressor 40 works in the top row and without a stator between the flow 92 from and flows from right to left. The flow is guided by guide vane 42. Flow from left to the right and is guided by guide vane 22 towards four inner high-pressure compressor 41 and without stators. The four blades of turbine 23 and the nozzle 25 is in front of the first turbine. The exhaust flow 98 from right to left is without stators between. The rotational speed of each disc engine is independent and shows u1, u2, u3 and u4.

In this embodiment, there are a total of four discs, but more or less than four discs are contemplated, based upon optimization for cost or performance. The figure shows that the blades in each row are arranges in alternating orientations to compress the flow or air expanding of air through the blade alternations.

FIG. 8 shows a sectional view of the disc engine, cooling lubrication of the bearings 28, cooling the blade of the turbine 23 by air bleed from the section of the high-pressure compressor section 41 through air bleeding holes 51 to the hollow body of the blade of turbine 23 and through holes 50 to the hollow body of the low-pressure compression 40. The two blades of the low pressure and high-pressure compressor 40 act as fins for cooling the blades of turbine 23.

The blade of the low-pressure compressor 40 in the top of FIG. 8 shows that the blades in each disc are arranged in alternating orientations to compress the flow 92 of air through the blades of the low pressure compressor 40 alternating. The orientation of the blades of the inner blade 41 is contoured to push and compress the air through the blades of high-pressure compressor 41. Arrow 98 shows air flow through the compressor while arrow 96 shows exhaust flow through the turbines. The flow of oil into 95 and out 97 of the bearing 28. The oil flow through paths in the shaft 30. The oil flow in the bearings 28 allows both lubrication and cooling to the bearings 28.

FIG. 9 shows a sectional view of the cooling of the nozzle cooling system where the nozzle 25 and the air guide fan 42 are one hollow body and the air bleed 53 from the high pressure compressed air to the hollow body of the nozzle 25 and guide fin 42.

Figure 10A:
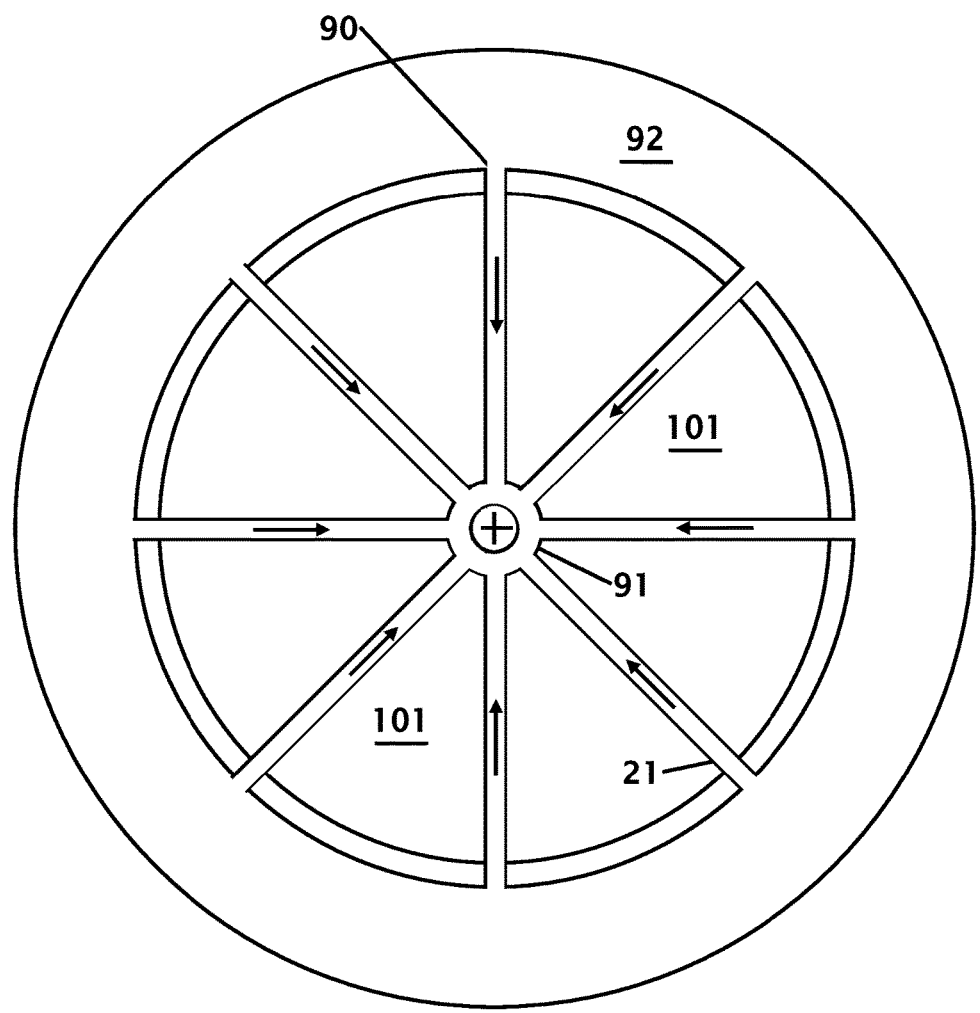
FIGS. 10a and 10b show sectional views of the exhaust nozzle that is used to transfer air from the low compressor blade to the high compressor blade taken from FIG. 2.
Figure 10B:
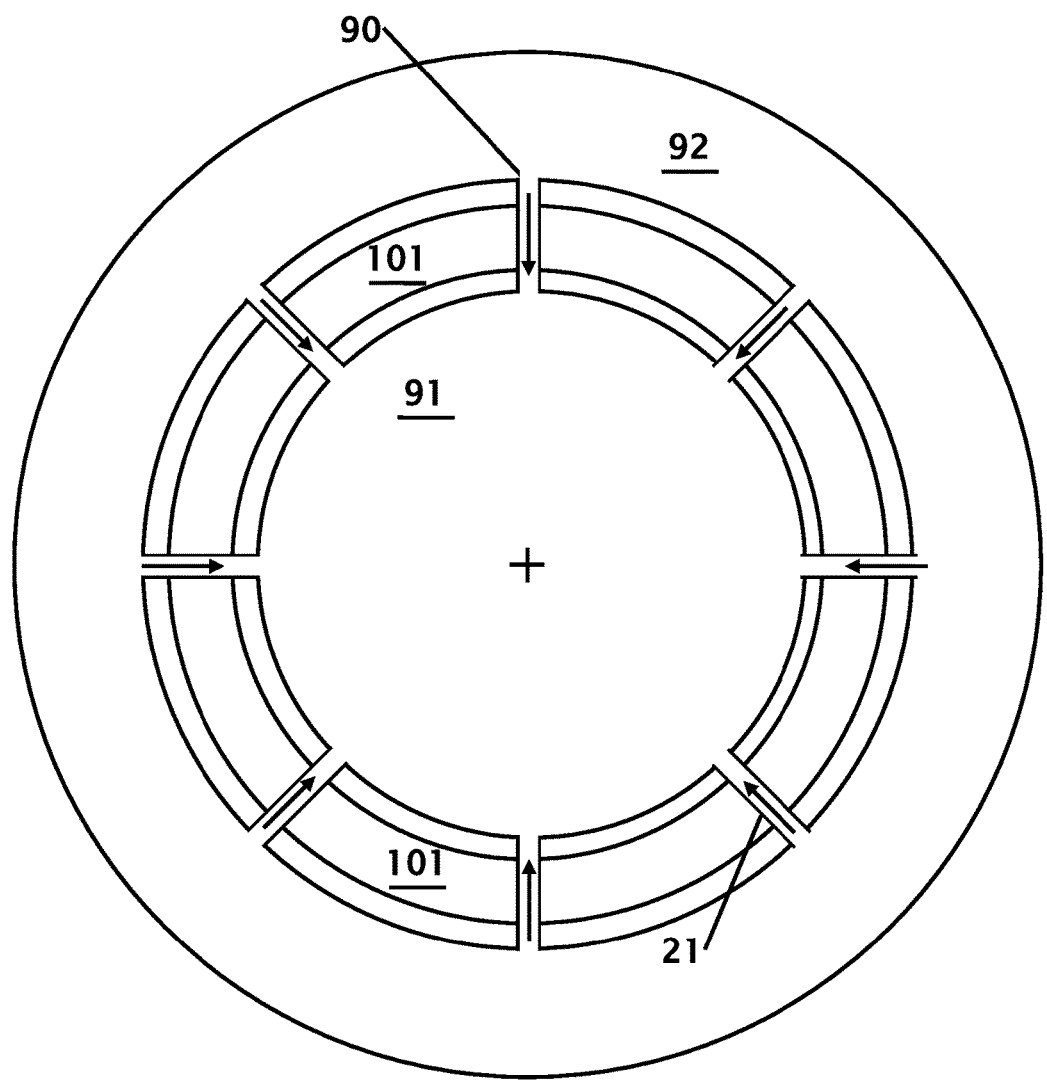

FIGS. 10*a* and 10*b* show sectional views of the exhaust nozzle 99 and the pipes 21 that are used to transfer air flow 92 that transfers through the pipes 21 and into the hollow exhaust nozzle 99. The transfer air flow 92 then enters into the guide vane 22 and into 98 the high-pressure compressed air flow 98 taken from FIG. 2. In this view, the pipes that move the air from the outer or low-pressure compressed air 90 to the inner or high-pressure compressed air 91. Cross-section 10*a* is near the inlet of the high-pressure compressor 41, and cross-section 10*b* is at the end of the nozzle of the exhaust 99 (as seen in FIG. 2). The air transfer 92 enters through pipes 21 as air flow 90 and exits the pipes 21 as air flow 91.

Thus, specific embodiments of a disc turbine jet engine have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A disc turbine engine comprising:
   a front fan, a low-pressure compressor section containing at least one low-pressure compressor, a high-pressure compressor section containing at least one high-pressure compressor, a turbine section containing at least one turbine, a combustion chamber, a nozzle, an exhaust nozzle, a guide vane, and a multi-disc engine;
   said multi-disc engine is constructed with at least two discs;
   each disc of the at least two discs comprising:
      a bearing surrounded by a high-pressure compressor of the at least one high-pressure compressor, said high-pressure compressor comprising at least one high-pressure compressor blade,
      said high-pressure compressor surrounded by a turbine of the at least one turbine, said turbine comprising at least one turbine blade, said turbine surrounded by a low-pressure compressor of the at least one low pressure compressor, said low-pressure compressor comprising at least one low-pressure compressor blade, said bearing, said high-pressure compressor, said turbine and said low-pressure compressor of each disc of the at least two discs configured in a concentric planar disc;

a fixed shaft that holds said multi-disc engine in a housing;

a fan shaft that is located around said fixed shaft and is connected to a first disc of the at least two discs, said fan shaft being connected to said front fan with a gear; and a first air is bled from the high-pressure compressor section of the disc turbine engine into the at least one high-pressure compressor blade of the at least one disc of the at least two discs, the first air traveling through the high-pressure compressor blade of the at least one disc of the at least two discs into the at least one turbine blade of the at least one disc of the at least two discs and into the at least one low-pressure compressor blade of the at least one disc of the at least two discs.

2. The disc turbine engine according to claim 1, wherein said fixed shaft has a first channel and a second channel;

said first channel is for oil feeding through said bearing of each disc of the at least two discs, and said second channel is for a return of said oil from said bearing of each disc of the at least two discs.

3. The disc turbine engine according to claim 2, wherein at least a portion of said first channel and a portion of said second channel are located in front of said front fan to intercool said oil in said first channel and said second channel.

4. The disc turbine engine according to claim 1, wherein said disc turbine engine does not include a stator between any consecutive discs of said at least two discs.

5. The disc turbine engine according to claim 1, wherein said nozzle is located in front of the respective turbine of the first disc of the at least two discs, said guide vane is located in front of the respective low-pressure compressor of the first disc of the at least two discs, and the nozzle is connected to the guide vane as one hollow body.

6. The disc turbine engine according to claim 5, wherein a second air which has passed through the high-pressure compressor section of the disc turbine engine is bled through the nozzle and into the guide vane.

7. The disc turbine engine according to claim 6, wherein said guide vane acts as a fin to cool said nozzle.

8. The disc turbine engine according to claim 1, wherein a second air which has exited the low-pressure compressor section of the disc turbine engine runs through at least one pipe and into a hollow body of the exhaust nozzle and into said high-pressure compressor section.

9. The disc turbine engine according to claim 8, wherein the second air flowing inside said at least one pipe and into the hollow body of said exhaust nozzle absorbs energy from exhaust gas and increases a pressure of the second air flowing inside the at least one pipe.

10. The disc turbine engine according to claim 1, wherein the first air in the at least one low-pressure compressor blade of the at least one disc of the at least two discs is injected into the low-pressure compressor section of the disc turbine engine.

11. The disc turbine engine according to claim 1, wherein said disc turbine engine is a turbo jet engine.

12. The disc turbine engine according to claim 1, wherein said disc turbine engine is a turbofan engine.

13. The disc turbine engine according to claim 1 wherein said disc turbine engine is a turbo shaft engine.

14. The disc turbine engine according to claim 1, wherein the bearing of each disc of the at least two discs is connected to the fixed shaft.

15. The disc turbine engine according to claim 1, wherein each disc of the at least two discs runs freely and individually from the other discs of the at least two discs and each disc of the at least two discs is counter-rotating.

* * * * *